United States Patent [19]

Reed et al.

[11] Patent Number: 5,793,593

[45] Date of Patent: Aug. 11, 1998

[54] METHOD AND APPARATUS USING A FIVE-WIRE NETWORK FOR DISTRIBUTION OF ELECTRICAL POWER

[75] Inventors: Robert G. Reed, Port Crane; Leon D. Hall, Vestal, both of N.Y.

[73] Assignee: New York State Electric & Gas Corporation, Binghamton, N.Y.

[21] Appl. No.: 547,511

[22] Filed: Oct. 24, 1995

Related U.S. Application Data

[63] Continuation-in-part of Ser. No. 192,890, Feb. 7, 1994, abandoned.

[51] Int. Cl.⁶ .................................................. H02H 3/00
[52] U.S. Cl. ........................... 361/93; 361/107; 361/38; 361/54; 307/90
[58] Field of Search ................................ 361/42, 47, 38, 361/40, 54, 56, 93, 107; 174/32, 33, 35 R, 37, 38, 39; 307/89–91, 147; 333/12, 177

[56] References Cited

U.S. PATENT DOCUMENTS 1,938,732  12/1933  Vaage .............................. 307/90
2,214,134   9/1940  Herz .............................. 307/90

*Primary Examiner*—Jeffrey A. Gaffin
*Assistant Examiner*—Sally C. Medley
*Attorney, Agent, or Firm*—Salzman & Levy

[57] ABSTRACT

The present invention features a method and an apparatus for distributing electrical power from a power source to a distribution transformer, using at least one hot-phase conductor, a neutral conductor and an independent ground conductor. The neutral conductor is connected to the ground conductor at only one point in the distribution system, preferably at or near the power source. Normal imbalance current flows only in the neutral conductor. Return current flow in the earth is eliminated by the single point neutral-to-ground connection. Magnetic field (MF) generation in this power distribution system is thus reduced and stray voltage problems eliminated. In addition, high-impedance faults are easily detected because the only current ever flowing in the ground conductor is fault current. A method is also described for converting existing power distribution systems to the independent ground topology of the present invention.

17 Claims, 7 Drawing Sheets

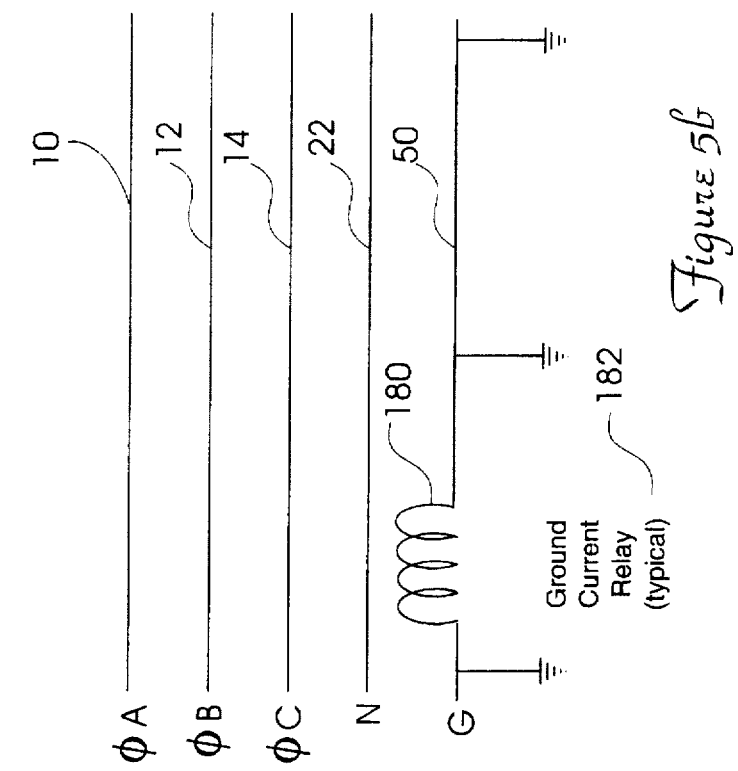
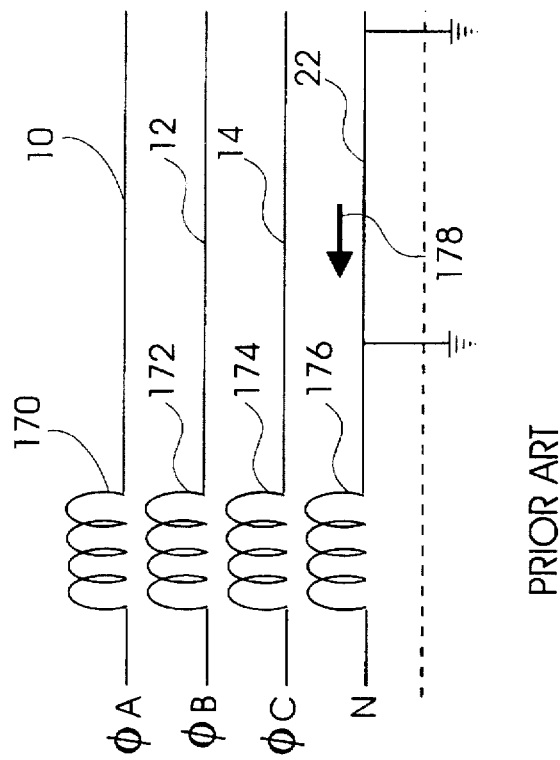

METHOD AND APPARATUS USING A FIVE-WIRE NETWORK FOR DISTRIBUTION OF ELECTRICAL POWER

This is a continuation-in-part of application Ser. No. 192,890 filed on Feb. 7, 1994 now abandoned.

FIELD OF THE INVENTION

The invention pertains to the distribution of alternating current (AC) electrical power on utility class systems and, more specifically, to the distribution of AC electrical power by means of a utility class, three-phase, five-wire system in which, in addition to the conventionally employed three hot-phase conductors and the neutral conductor, an independent ground conductor is provided.

BACKGROUND OF THE INVENTION

In the conventional utility-class electrical power systems of generation, transmission and distribution, electrical power is first generated at a power generation site by one of a variety of possible means. Generated power is transformed (stepped up) to very high voltages, typically on the order of 115 kV to 345 kV, and transmitted to end users who may be hundreds or thousands of miles from the power generation site. At the terminus substation of an electrical power transmission line, voltage is again transformed (stepped down) to lower voltages (typically, 5 kV–35 kV) for distribution to users.

That system of wires, cables, transformers, protective devices and other ancillary equipment connecting the substation with the power users is referred to herein as an electrical distribution system, or, a distribution system. Such systems comprise distribution lines that employ three or four conductors arranged in two common topologies, ungrounded and grounded. In addition, the connection of the source transformer is usually one of two types, delta or wye. These types of topologies and connections are well known to those skilled in the art. Most modern distribution systems are three-phase (3φ) systems, which are implemented by using four conductors in a grounded topology with a wye source transformer connection. Three conductors are "hot", or, current-carrying for the three phases, respectively; each conductor is connected to the secondary side of a source transformer. The fourth conductor is a neutral conductor which is grounded at the source transformer, at distribution transformers throughout the distribution system, at the loads and at intervals in between (no fewer than four per mile).

When the loads on a 3φ utility-class distribution system are perfectly balanced (i.e., when equal current is being drawn in phase A, phase B and phase C), no current flows in the neutral conductor. In actual application, however, a perfectly balanced system is extremely rare. As differing amounts of current are drawn in each of the three phases, a return current flows in the neutral conductor from the distribution transformer back to the source transformer. Because the neutral line is grounded at multiple points throughout the distribution system, parallel impedances in the earth exist. When the impedance path of the earth is essentially equal to the impedance of the neutral conductor itself, approximately 50% of any return current will flow through the earth instead of the neutral conductor.

When current flows in any conductor, a magnetic field (MF) is generated. (It is important to note at this juncture that MFs are the subject of ongoing health-effects studies.) On a perfectly balanced, 3φ distribution line with the current-carrying conductors in close physical proximity, the instantaneous MF is largely cancelled at locations that are more than a few feet from the line. That is, the vector sum of the field components is approximately zero. In an unbalanced 3φ system with return current flowing in the neutral conductor, a certain degree of MF cancellation also occurs. However, since the return current is divided between the neutral conductor and the earth, cancellation of a magnetic field in the vicinity of a phase conductor is not achieved to the extent optimal. In addition, that portion of the return current flowing in the earth generates its own MF, thus exacerbating the problem. Consequently, the more poorly balanced the loads on a multiphase system, the poorer the opportunity becomes for phase cancellation. This results in higher MF levels in the proximity of the distribution system.

In addition, the current traveling in the earth itself may find its way onto power users' secondary electrical systems, municipal gas and water lines and/or other electricity-conducting surfaces in contact with the earth. Since distribution lines run through residential and commercial neighborhoods, such current may travel near or through dwellings, offices, schools and other inhabited structures. These currents, too, generate magnetic fields, in addition to currents that may already exist in those areas. Electric utilities and/or power distribution companies are currently searching for ways to attenuate or eliminate such MFs.

A second phenomenon caused by return currents in a distribution system occurs when such currents encounter an impedance along the return path. When such impedances are encountered, potential differences (voltages) between points along the current path are generated. Theoretically, the neutral conductor serves as a zero-voltage ground reference at any point in the distribution system; however, small potential differences may be present (a situation known as neutral-to-earth voltages). Since the primary and secondary neutrals are interconnected at each distribution transformer location, the possibility exists that some portion of any voltage present on either neutral will be transferred to the other. In addition, once the earth is made a legitimate path for return currents, and since it has a finite impedance, potential differences may exist between any two points along that path, thus creating stray voltages between the earth ground and the neutral ground. This phenomenon is of particular concern in areas where many farm animals are found. The elimination of stray voltages in grounded wye topologies without perfect phase balance is difficult, requiring that expensive isolation devices be placed between neutral connections on the primary and secondary sides of distribution transformers.

Another problem present in the grounded wye and other distribution systems is the existence of fault conditions, which must be detected and cleared. A fault is any unintended load occurring on the distribution system. Faults are generally described as being either bolted (short-circuit) or high-impedance (high-z). In the case of a bolted fault, the fault current is extremely high (hundreds or thousands of amperes [amps], usually). Bolted faults are relatively easy to detect and clear. As far as detection is concerned, high-z faults are more problematic. These faults generally result in fault currents of 50 amps or less that are normally detected by protective devices (ground current relays or the like) which monitor ground current levels. In conventional distribution system topologies, the ground current levels may vary significantly under no fault conditions. These devices must be set at current levels that are high enough to avoid false (nuisance) indications or trips. The result, however, of these high-current sensitivity settings is that high-z faults (which produce relatively small ground currents) are difficult to detect.

It would be advantageous, therefore, to provide a distribution system topology in which not only are magnetic fields minimized, but ground current induced magnetic fields also eliminated.

It would also be advantageous to provide a distribution system topology in which stray voltages are either eliminated or held to very low voltage levels.

It would be further advantageous to provide a distribution system topology in which high-z faults are easily and inexpensively detected.

DISCUSSION OF RELATED ART

Reference books describing distribution systems, their topologies, transformer connections and system grounding are well known in the industry. Several of the best include the *Electrical Transmission and Distribution Reference Book* (by the Central Station Engineers of the Westinghouse Electric Corporation, 1964) and the *Electric Utility Engineering Reference Book, Volume 3: Distribution Systems* (by the same authors as aforementioned, 1965).

In "Comparison between Grounded and Ungrounded Electric Power Distribution System" (Mehran University *Journal of Engineering and Technology*, Vol. 3, No. 3, Jul., 1984), authors Burdi, Chang and Keerio compare grounded neutral and ungrounded neutral distribution systems for ascertaining differences in safety and reliability in the Pakistani power grid.

In a paper by N. D. Reese and T. C. Surbrook, entitled "Primary and Secondary Electrical Systems" (American Society of Agricultural Engineers, Publication 3-85, 1985), the authors discuss the different types of primary and secondary distribution systems, their specific designs and how they contribute to stray voltage. In this way, they attempt to show how a normally functioning, grounded distribution line will produce stray voltage with the presently used designs of today.

In *Constraints on Mitigating Magnetic Fields on Distribution Systems*, prepared for the 1991 IEEE Training & Development Conference and Exposition, author James Burke discusses state-of-the-art distribution system topology and contraints upon the distribution system designs, with regard to magnetic field management techniques.

The *IEEE Guide for the Application of Neutral Grounding in Electrical Utility Systems, Part IV, Distribution*, recognized as American National Standard C 62.92.4—1991, is the state-of-the-art distribution system grounding guide for the electric utility industry. Discussed herein are distribution system topology, transformer connections, ground fault detection, neutral interconnectors, etc.

In U.S. Pat. No. 5,068,543 (entitled "Low Hazard Extremely Low Frequency Power Transmission Line" and issued to OHKAWA on Nov. 26, 1991), problems with very low frequency (VLF) magnetic fields resulting from the transmission of electrical power are shown. OHKAWA teaches a system whereby MF radiation may be reduced by altering the physical arrangement of a high-voltage transmission line's conductors.

In U.S. Pat. No. 5,175,442 (entitled "Six-Phase Power Line Geometry for Reduced Electric and Magnetic Fields" and issued to ASHLEY on Dec. 29, 1992), more effective cancellation of MFs is alleged, with only a 60° difference between the phases.

In *Ground Current Magnetic Field Study*, (pp. 1–5 of Research Report EP 90-48, prepared for the Empire State Electric Energy Research Corporation, January 1993), author Stewart Maurer discusses the relationship between primary and secondary circuitry, ground currents and magnetic fields. He further discusses field management techniques which are confined to the secondary, rather than the primary, portion of the distribution system.

In "EMFs Run Aground," (*Science News*, Vol. 144, Aug. 21, 1993), Janet Raloff describes present thinking about magnetic fields, as well as the results of an MF survey begun in 1990 and completed in early 1993. Discussed also are the various strategies under consideration for the reduction of MFs.

In U.S. Pat. No. 4,725,739 (entitled "AC Branch Power Distribution Filter" and issued to McCARTNEY ET AL. on Feb. 16, 1988), a power distribution filter is used to filter and suppress an AC power line. The filter is used to protect load devices, such as computers and office machines from noise and interference on the AC power line. A plurality of elongate, flat conductors are coupled to the AC power source and include a neutral conductor, a ground conductor and at least one live conductor. An inductance device is connected in series with each of the live conductors and the neutral conductor. McCARTNEY physically connects two wires (ground and neutral). The path from neutral to ground runs through transient voltage suppressors, a common node, and a gas discharge tube. The gas discharge device is a high impedance to ground device. The intent of McCARTNEY is to connect several devices in the path from neutral to ground; neutral to ground are not directly connected together. The transient suppression circuitry of McCARTNEY works like a lightning arrester during high voltages. The device discharges and equalizes voltage stress, but, during normal operations, the points are insulated from each other.

SUMMARY OF THE INVENTION

In accordance with the present invention, there are provided a method and an apparatus for the utility-class distribution of electrical power in which an added, dedicated ground conductor and a separate, isolated neutral conductor are employed. One or more hot conductors are connected between the power source at a substation (or another source) and the distribution transformers, as are the neutral and ground conductors. The use of a dedicated ground conductor allows the separation of the function of the neutral conductor from that of the ground conductor. The neutral and ground conductors are connected to one another at only one point, at, or close to, the power source. This causes essentially all of the return current to flow in the neutral conductor, substantially eliminating the return currents flowing in the earth and the magnetic field generated therefrom. MFs are also reduced in the inventive system because all current-carrying conductors (both phase conductors and neutral ones) are located in close physical proximity to each other. This also contributes to field cancellation. Because ground current flow is eliminated, potential differences along the ground path are substantially reduced or even eliminated, thus also effectively eliminating stray voltages. Finally, because the only time that current flows in the dedicated ground conductor is during a fault condition, high-z faults may be easily and inexpensively detected and cleared.

BRIEF DESCRIPTION OF THE DRAWINGS

A complete understanding of the present invention may be obtained by reference to the accompanying drawings, when taken in conjunction with the detailed description thereof and in which:

FIG. 5a is a schematic diagram showing high-z fault detection in a distribution system of the prior art;

FIG. 5b is a schematic diagram showing high-z fault detection in the distribution system of the instant invention;

DESCRIPTION OF THE PREFERRED EMBODIMENT

Generally speaking, this invention pertains to the distribution of alternating current electrical power from a substation to distribution transformers at a plurality of user sites. More specifically, the invention features a utility class system for distributing AC electrical power wherein magnetic field generation is reduced, stray voltages virtually eliminated and high-z faults easily detected.

A power distribution system, by definition, is responsible for carrying electrical power from one or more power sources to one or more electrical loads. Power sources of a typical distribution system may include the secondary winding of a source transformer, an electrical generator or any of a variety of power sources known in the art as distributed generation sources. Photovoltaic panels, fuel cells, wind-, geothermal-, gas-, diesel-, or water-powered generators or the like are some common distributed generation sources. In practice, there is no limit to the variety of generating devices which may act as the power source for a distribution system. A load is any device that is capable of dissipating electrical energy by performing work (typically by transforming it to heat, light or motion). Loads are typically connected to the primary distribution system via distribution transformers. These transformers divide the power distribution system into primary and secondary sections.

Figure 1:
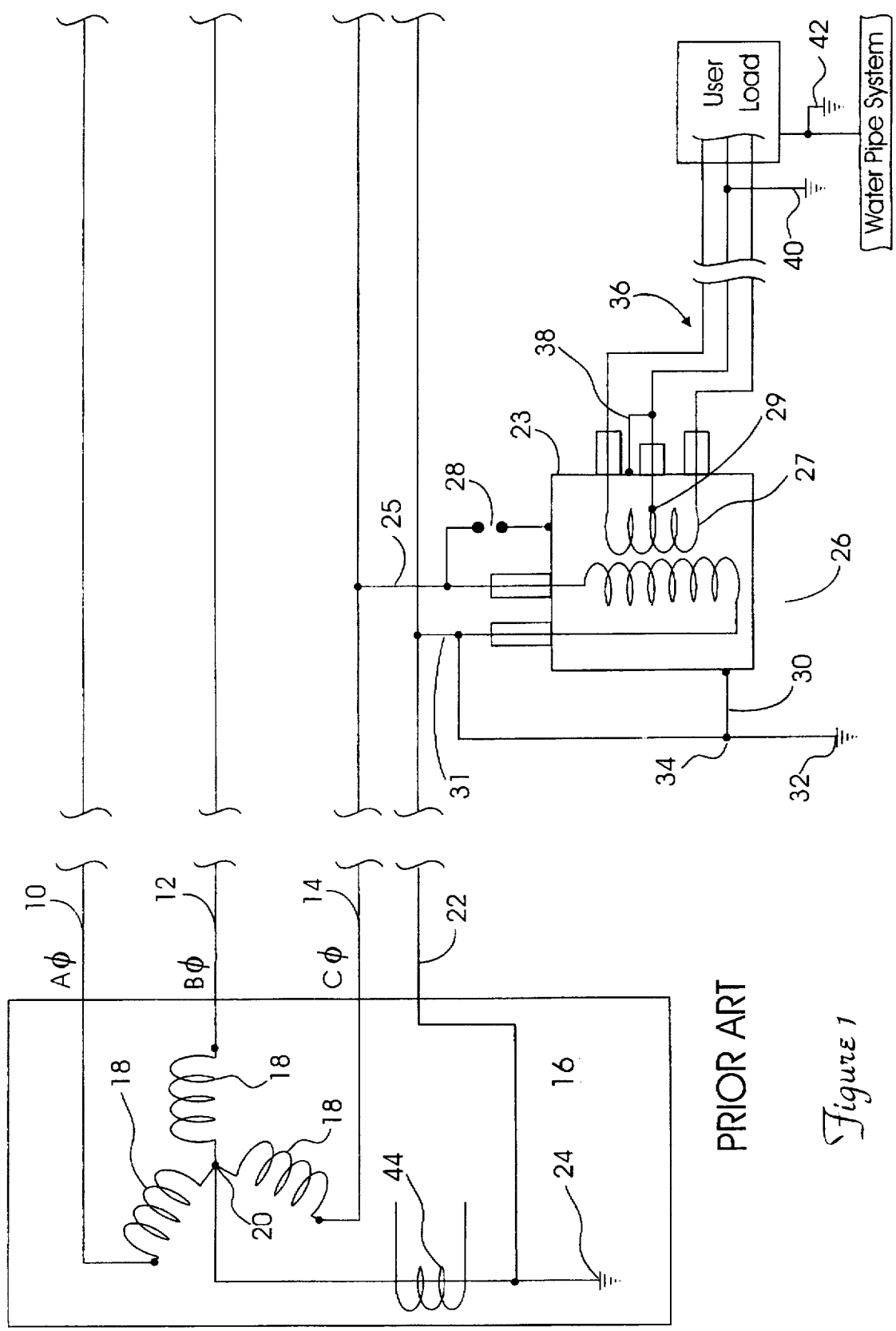
FIG. 1 Is a schematic diagram of an electrical power distribution system of the prior art.

Referring now to FIG. 1, there is shown a schematic diagram of a typical power distribution system of the prior art. Phase A, B and C conductors 10, 12 and 14, respectively, are shown connected by suitable means to a source transformer, shown generally at reference numeral 16. Secondary windings 18 of source transformer 16 are connected at a common point 20. Common point 20 is connected to ground 24, thus producing a grounded wye configuration. Both neutral conductor 22 and earth ground 24 are connected to common point 20. A current-sensing device 44 monitors current flowing to and from common point 20.

Current-carrying conductors 10, 12 and 14, along with neutral conductor 22, carry electrical power from source transformer 16 to a distribution transformer, shown generally at reference numeral 26. Distribution transformer 26 is a single-phase transformer, connected only to a single phase (in this case, phase C conductor 14) of the distribution system via hot feed line 25. A surge- or lightning-arresting device 28 is connected from the hot feed line 25 to the housing or case 23 of distribution transformer 26, the case of which is grounded by conductor 30 to the ground 32. The surge- or lightning-arresting device 28 may, alternatively, connect directly to the ground with a ground strap that connects the housing or case of distribution transformer 26 to ground. The neutral conductor 22 is also grounded at distribution transformer 26 at the ground 32 via neutral connection 31. A dual return current path, consisting of neutral conductor 22 and the earth between ground points 24 and 32, is thus established. Other electrically equivalent ways for connecting such systems will be obvious to those skilled in the art.

The secondary winding 27 of distribution transformer 26 is connected to a three-conductor user service feed cable 36. The center tap 29 of the secondary winding 27 is also grounded to the transformer case 23 by means of conductor 38. Consequently, the center tap 29 of the secondary winding 27 is effectively attached to neutral conductor 22 through the transformer case 23 and conductor 30.

At the user site, the conductor of cable 36 (attached to the center tap 29 at the transformer 26 end) is also grounded at the user electrical service entrance 40 and again, if applicable, to a municipal water system pipe network, via ground 42. The neutral connection 31 on the primary side of transformer 26 and the neutral connection (center tap 29) on the secondary side of transformer 26 (via conductor 38) are both grounded.

Figure 2:
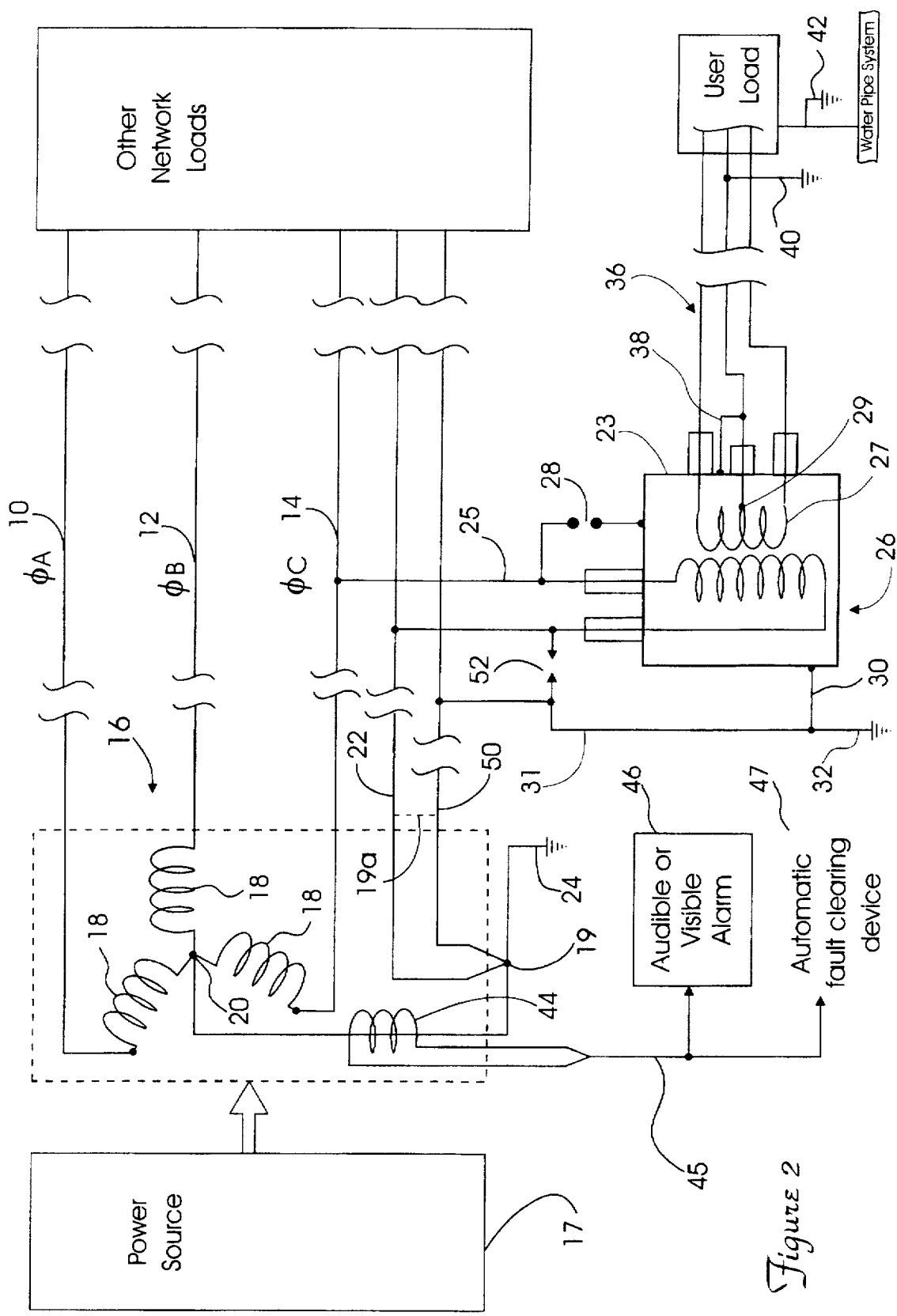
FIG. 2 is a schematic diagram of the electrical power distribution system of the present invention.

Referring now to FIG. 2, there is shown a schematic diagram of the power distribution system of the present invention. Numerals referring to identical elements of the distribution system of the prior art (as shown in FIG. 1) remain the same. Phase A, B and C conductors 10, 12 and 14, respectively, are connected to a source transformer, shown generally at reference numeral 16. Secondary windings 18 of source transformer 16 are connected at a common point 20 and also to the earth at ground point 24, thus producing a grounded wye configuration.

Other sources of power 17 that could drive the secondary windings are transformer secondaries, generators or distributed generation sources. Distributed power generation sources include photovoltaic panels, geothermal, wind or hydroelectric-driven generators, fuel cells, or gas or diesel-driven generators.

Common point 20 is connected both to a neutral conductor 22 and to an earth ground 24. Moreover, ground conductor 50 is connected to neutral conductor 22 and ground point 24. In the preferred embodiment, ground conductor 50 and neutral conductor 22 are connected to each other at reference numeral 19, which is at or near the power source; but it should be understood that both conductors 50 and 22 may be connected to each other at a point displaced from the power source, shown in phantom as reference numeral 19a. In either case, this one point is the only connection between neutral conductor 22 and ground conductor 50 in the distribution system. This connection itself 19 or 19a is ideally solid and direct, but could take the form of any low impedance device, such as a conductor configured in one or more loops, not shown. Therefore, the term "direct", as used herein, is meant to include all such devices that are functionally within the scope of the invention.

A current-sensor 44 (usually a current transformer) is disposed in proximity to ground conductor 50 or, alternatively, elsewhere in the ground connection path of transformer 16. Current-sensing device 44 may generate a signal 45 representative of the current in the conductor being monitored. When signal 45 exceeds a predetermined level, it may be used to activate an alarm 46 or to trip a breaker or other automatic fault-clearing means 47. Because neutral conductor 22 is separated from ground conductor 50, current-sensor 44 may be disposed at numerous points in the distribution system, without losing the ability to detect high-z faults. In addition, multiple current sensors (not shown) could be disposed along ground conductor 50 throughout the distribution system to aid in locating high-z faults, thus providing the possibility of "selectivity" on the distribution line.

Current-carrying conductors 10, 12 and 14, in cooperation with neutral conductor 22, carry electrical power from source transformer 16 to a distribution transformer 26. Ground conductor 50 accompanies, in close physical proximity, conductors 10, 12, 14 and 22 on distribution poles or in underground conduits (not shown). Distribution transformer 26 is a single-phase transformer and is, therefore, connected only to a single phase (in this case, phase C conductor 14) of the distribution system. A surge- or lightning-arresting device 28 is connected from the hot feed line 25 to the housing or case 23 of distribution transformer 26, the case of which is grounded by conductor 30 to ground 32. The surge- or lightning-arresting device 28 may, alternatively, connect directly to the ground with a ground strap that connects the housing or case of distribution transformer 26 to the ground. The case 23 of transformer 26 is grounded by conductor 30 at ground point 32. Neutral conductor 22 is no longer grounded at the primary winding of distribution transformer 26. The secondary winding 27 of transformer 26 is connected to a three-conductor power user service feed cable 36. The center tap 29 of the secondary winding 27 is also grounded to the transformer case 23 by means of conductor 38.

At the power user's site, the conductor of cable 36 (attached to the center tap 29 of the secondary winding 27 at the transformer end) is also grounded 40 at the electrical service entrance and again, if applicable, to a municipal water system, via ground point 42. The neutral conductors on both the primary and secondary sides of transformer 26 are now totally isolated from each other. A spark gap 52 (or other device which can respond to short-term overvoltage conditions) provides a momentary connection between neutral conductor 22 and the transformer case 23, in the event of a fault or surge on the line. Surges are usually caused by lightning. Fault or surge conditions are the only times that an interconnection is made between neutral conductor 22 and ground conductor 50, except at source transformer 16 as hereinabove noted.

Figure 3A:
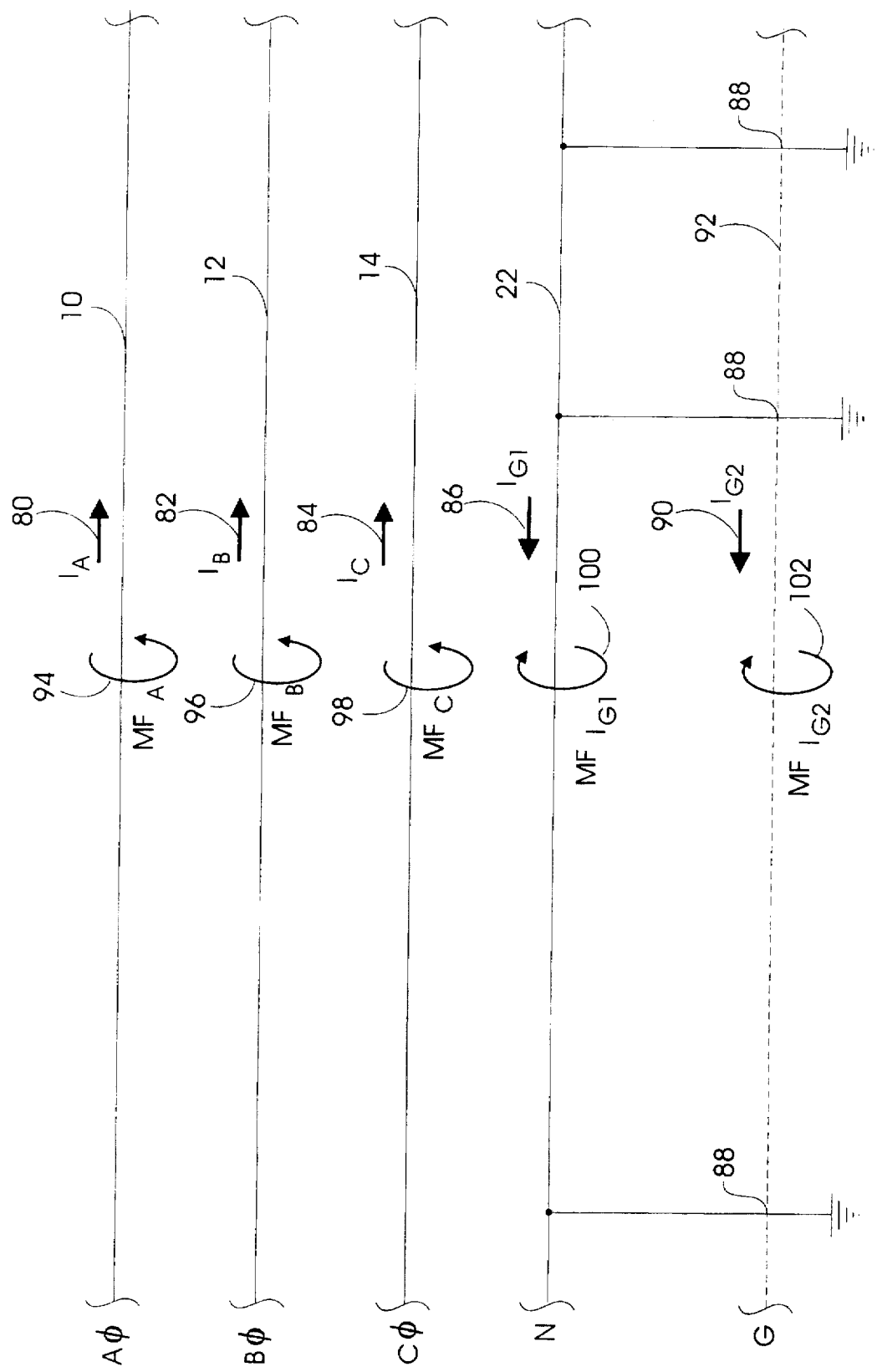
FIG. 3a is a schematic diagram showing magnetic field generation in a distribution system of the prior art.

Referring now to FIG. 3a, there is shown a schematic diagram of the conductors of an electrical distribution system of the prior art. Hot phase conductors 10, 12 and 14 carry phase currents $I_A$ 80, $I_B$ 82 and $I_C$ 84, respectively. A neutral conductor 22 carries a portion of the imbalance return current $I_{G1}$ 86. Neutral conductor 22 is grounded at a plurality of points 88. A portion of the imbalance return current $I_{G2}$ 90 flows through the earth, represented as conductor 92.

Current flow in any conductor generates a magnetic field. Each phase hot conductor 10, 12 and 14 generates $MF_A$ 94, $MF_B$ 96 and $MF_C$ 98, respectively. The magnitudes and phases of these MFs 94, 96 and 98 are dependent upon the current being drawn by loads (not shown) supplied by each phase hot conductor 10, 12 and 14, respectively. Imbalance return currents $I_{G1}$ 86 and $I_{G2}$ 90 also generate $MF_{IG1}$ 100 and $MF_{IG2}$ 102, respectively.

The levels of MF near a distribution line are determined by the effectiveness of field reduction, due to the cancellation of fields produced by currents in the individual conductors. To achieve total MF cancellation, two or more fields of equal magnitude and appropriate phase displacement would have to interfere destructively, so that their resultant vector sum is zero. Therefore, a condition for optimal cancellation near a distribution line is that the currents in the conductors have a vector sum of zero. This condition is obtained when the current vector in one conductor is equal to and opposite in direction to the vector sum of the currents in the other conductors. To the extent that the optimal condition is not achieved, only a partial cancellation may be expected; field reduction will be less than optimal.

Limited MF cancellation takes place in the distribution system of the prior art, because the imbalance return current $I_{G1}$, $I_{G2}$ (equal to the vector sum of the phase conductor currents) divides along two paths, to neutral conductor 22 and the earth's conductive path 92, respectively. Consequently, only a fraction (one-half, typically) of the imbalance return current flows in neutral conductor 22. While neutral conductor 22 is in close physical proximity to phase hot conductors 10, 12 and 14, only a limited field cancellation is achieved, because the neutral current is much less than the value for optimal cancellation. In addition to the limited MF cancellation occurring among MFs 94, 96, 98 and 100, an additional (relatively small, but generally uncancelled) $MF_{IG2}$ 102 is generated in the earth itself as the result of that portion of the imbalance return current $I_{G2}$ 90. Current $I_{G2}$ 90 may be distributed over the volume of earth under the wires or may be conducted by metallic water or gas mains, or other pipes or other electrical conductors, or by other structures on or in the earth.

Figure 3B:
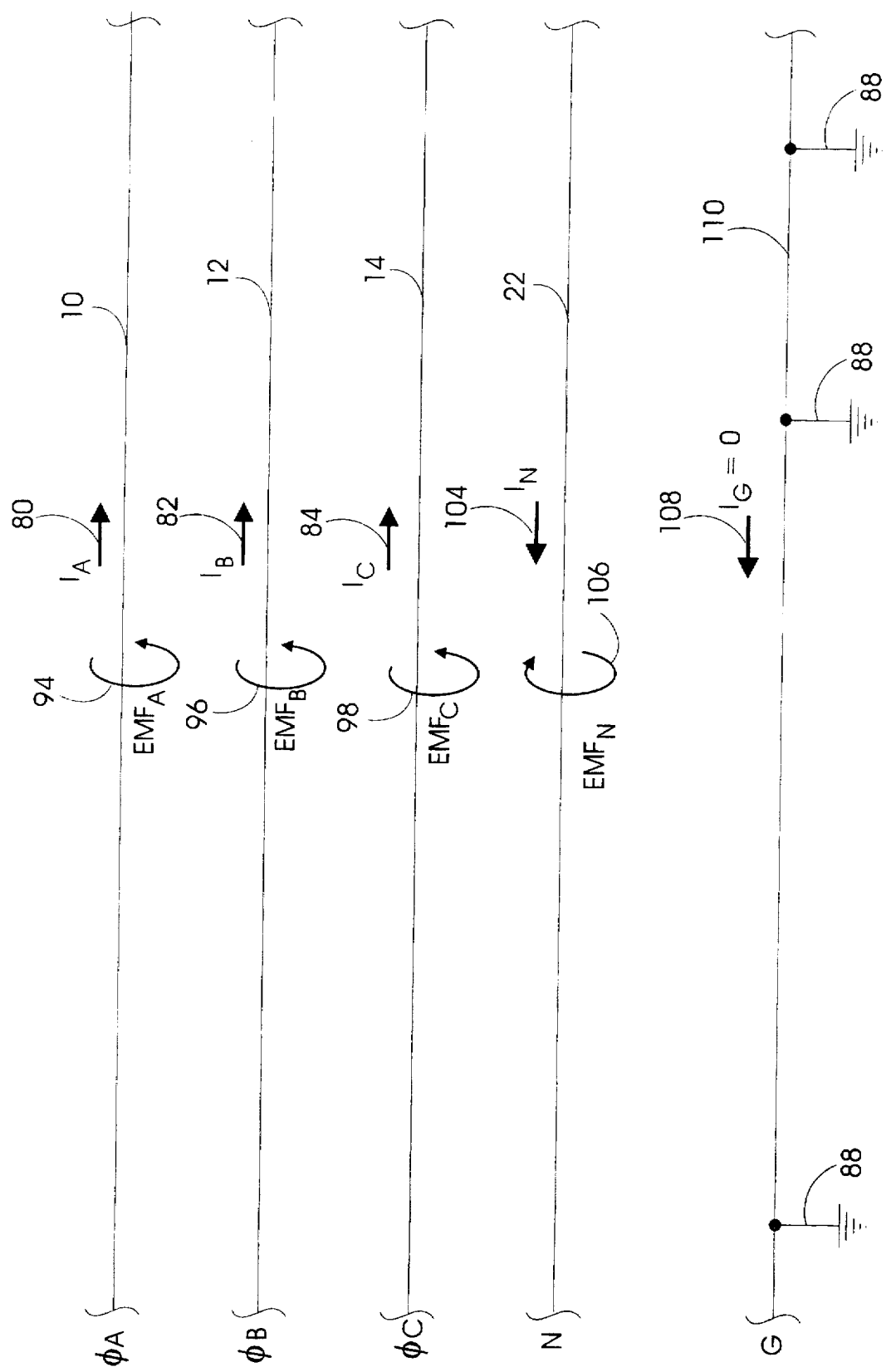
FIG. 3b is a schematic diagram showing reduced MF generation in the distribution of the present invention.

Referring now to FIG. 3b, there is shown a schematic diagram of the conductors of the present invention's primary electrical distribution system. Three hot-phase conductors 10, 12 and 14 carry phase currents $I_A$ 80, $I_B$ 82 and $I_C$ 84, respectively. Phase currents 80, 82 and 84 generate $MF_A$ 94, $MF_B$ 96 and $MF_C$ 98. All imbalance return current $I_N$ 104 (equal to the vector sum of the phase currents) flows in neutral conductor 22, generating $MF_N$ 106. Ground conductor 110 is connected to the earth at a plurality of points 88 and carries no current, exept during fault conditions. That is, $I_G$ 108 is essentially zero and, therefore, generates a negligible MF. All generated MFs 94, 96, 98 and 106 are generated in conductors within the primary distribution system. No current flow with accompanying MF generation occurs in the earth, or in pipes, or in other structures in or on the earth.

Magnetic fields produced by the present invention's primary distribution system are reduced, relative to the MF levels of the prior art's distribution network, for two reasons. First, the currents that flow in conductors in close physical proximity to each other have a vector sum of zero, the condition for optimal MF cancellation. Since current flowing in the earth is eliminated, MFs formerly associated with such current flows are also eliminated. Experimental evidence from computer simulation and test modeling shows reductions of approximately 60% in the overall MFs generated by an overhead distribution system of the present invention (compared to a conventional, grounded wye distribution system of the prior art) when calculations are performed for locations where observers would commonly be located. Reduced magnetic fields associated with the present invention pertain primarily to primary distribution systems having overhead construction.

Figure 4B:
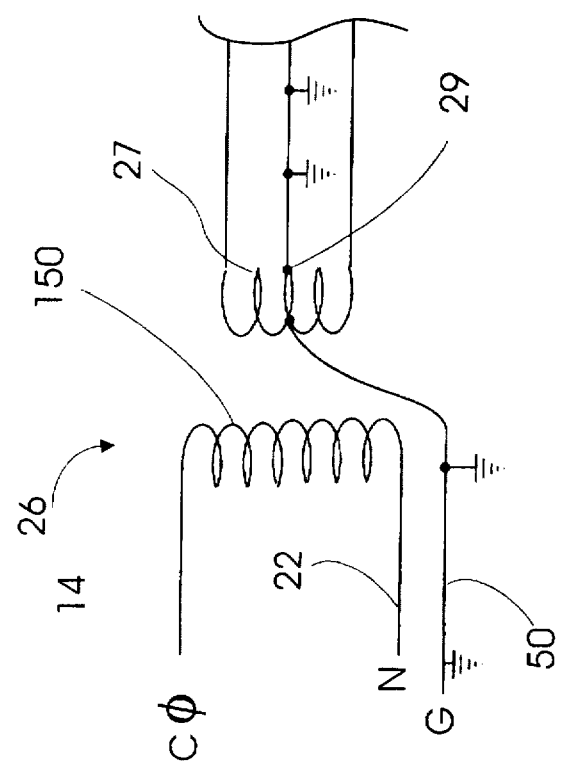
FIG. 4b is a schematic diagram showing how stray voltage is eliminated in the distribution system of the present invention.
Figure 4A:
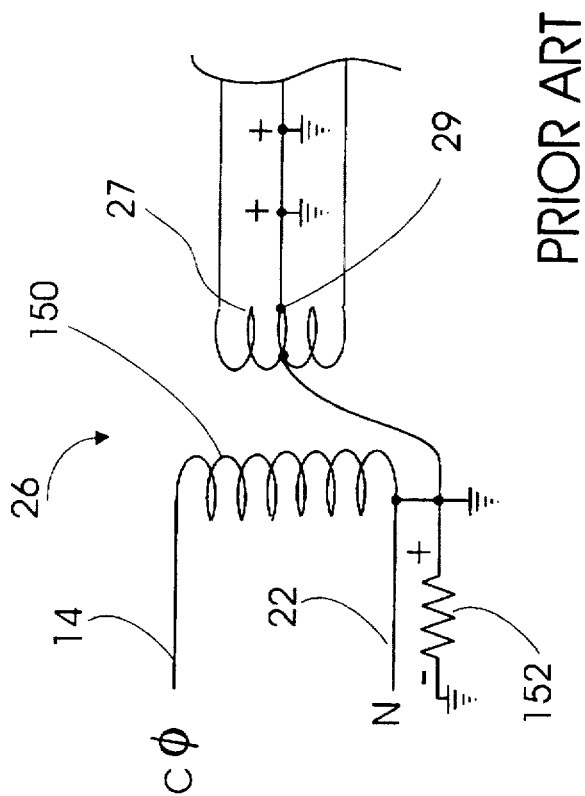
FIG. 4a is a schematic diagram detailing how stray voltage is generated in a distribution system of the prior art.

Referring now to FIG. 4a, there is shown a schematic diagram of the connection of a distribution transformer 26 of a grounded wye distribution system of the prior art. Transformer 26 is a single-phase transformer connected to the phase C conductor 14 of a three-phase distribution system (not shown). Current flows from phase conductor 14 through the primary winding 150 of transformer 26 and returns via a split path, that of neutral conductor 22 and the earth. The earth exhibits a finite impedance $Z_{EARTH}$ 152. According to Ohm's Law, current flow through an impedance generates a potential difference (voltage) across that impedance. Consequently, when the return current from transformer primary 150 divides between neutral conductor 22 and the earth impedance 152, a potential difference is developed across earth impedance 152. Such potential differences are known as stray voltages. Because the secondary winding 27 of transformer 26 is also grounded at center tap 29, the stray voltage appears on the neutral (center tap) conductor leading to a power user's service entrance.

Referring now to FIG. 4b, there is shown a schematic diagram of the connection of a distribution transformer 26 of the present invention's distribution system. Transformer 26 is a single-phase transformer connected to the phase C conductor 14 of a three-phase distribution system (not shown). Current flows from phase conductor 14 through the primary winding 150 of transformer 26. Because neutral conductor 22 of the distribution system of the present invention is not connected to the earth at transformer 26, all return current flows in neutral conductor 22. Because there is no return current flowing in the earth, no stray voltage is generated. Ground conductor 50 connects transformer 26 with other loads (not shown) and the power source (not shown). In the event of a ground fault on the distribution system, fault current will generally be carried by ground conductor 50. Even though center tap 29 of secondary winding 27 is grounded at transformer 26, there is no stray voltage impressed upon the neutral (center tap 29) conductor leading to a power user's service entrance.

Referring now to FIG. 5a, there is shown a schematic diagram of the conductor portion of a four-wire grounded wye power distribution system of the prior art. Current-monitoring devices (typically, current transformers) 170, 172 and 174 are placed proximate phase conductors 10, 12 and 14 that correspond to phases A, B and C, respectively, of the distribution system. An additional current-monitoring device 176 (also a current transformer, typically) monitors neutral conductor 22. Because the imbalance return current $I_N$ 178 flows both in neutral conductor 22 and the earth as hereinabove described, it is difficult to analyze the current measured in neutral conductor 22 by current-monitoring device 176. Current 178 typically represents 20-50% of the sum of the currents (not shown) in phase conductors 10, 12 and 14 under normal (non-fault) conditions. When a high-z fault occurs, it may be impossible to determine its presence since its contribution of current is small, and the current can be masked by normal current variations in neutral conductor 22. It is necessary to provide not only the four current-monitoring devices 170, 172, 174 and 176, but also elaborate circuitry (not shown) to process the information from the four aforementioned devices 170, 172, 174 and 176. This results in a relatively expensive fault- detection system which is virtually useless in detecting high-z faults.

Referring now to FIG. 5b, there is shown a schematic diagram of the conductor portion of the present invention's primary power distribution system. Phase conductors 10, 12 and 14 correspond to phases A, B and C of the distribution system, respectively. A single current-monitoring device 180 (typically, a current transformer) is placed proximate dedicated ground conductor 50. Because no current flows in ground conductor 50, unless there is a fault condition, a sensitive ground current relay may be connected to current-monitoring device 180. A ground current relay 182 is typically connected to current monitoring device 180. Ground current relay 182 could have adjustable sensitivity. There is no masking of the fault current, as in the prior art. In the inventive system, high-z faults can now be detected with high probability. The fault detection system of the present invention is simpler and less costly than that of the aforementioned prior art. Further, current-monitoring device 180 may be deployed anywhere along ground conductor 50, thus providing "selectivity" for fault isolation purposes.

Existing primary distribution systems may be converted to the topology of the present invention by the addition of a dedicated ground conductor between the power source and each distribution transformer on the system. In addition, all neutral grounds must be eliminated and a single neutral-to-ground connection made, preferably near the system's power source.

Figure 6A:
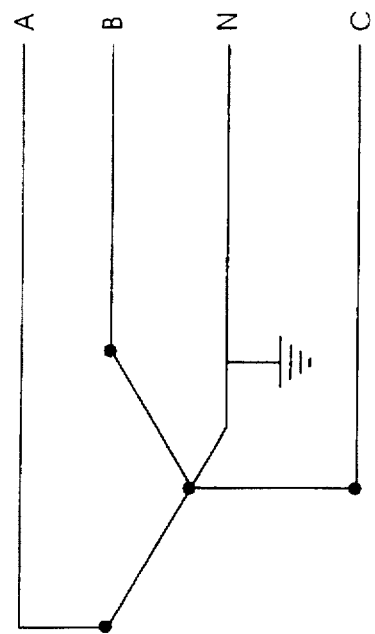
FIG. 6a is a schematic diagram of a four-wire, ungrounded neutral topology with a wye connection.
Figure 6B:
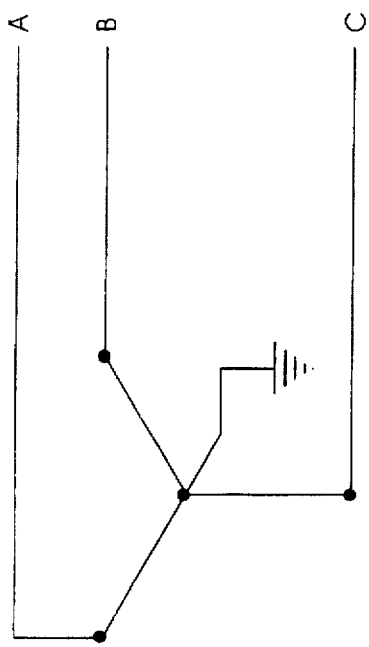
FIG. 6b is a schematic diagram of a three-wire ungrounded topology with a wye connection.
Figure 6C:
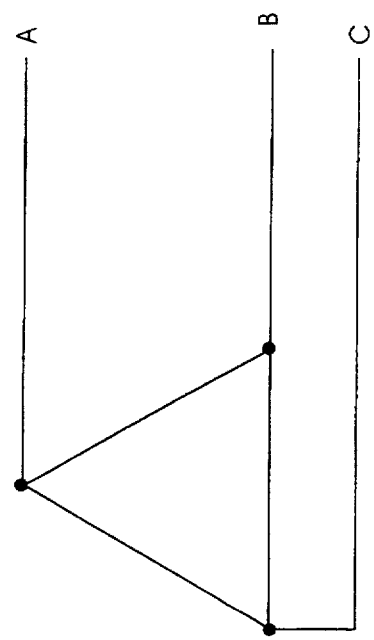
FIG. 6c is a schematic diagram of a three-wire, ungrounded topology with a delta connection.
Figure 6D:
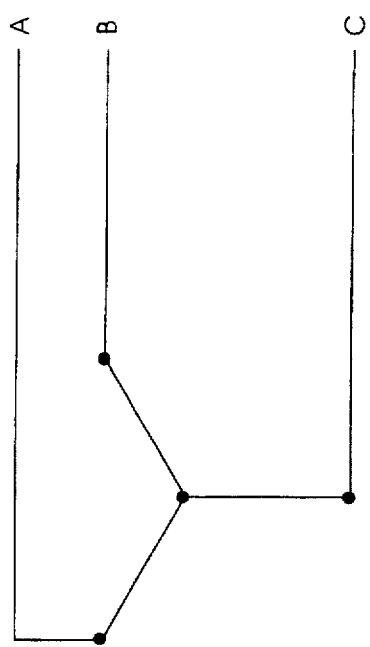
FIG. 6d is a schematic diagram of a three-wire, ungrounded topology with a wye connection.

It is well known in the art to configure polyphase distribution systems in a variety of grounded, ungrounded, wye or delta topologies. Referring now to FIG. 6a, there is shown a schematic diagram of a four-wire, grounded neutral topology. FIG. 6b illustrates a schematic diagram of a three-wire grounded wye topology. FIG. 6c illustrates a three-wire, ungrounded delta topology. FIG. 6d illustrates a three-wire, ungrounded wye topology. It will be obvious to those skilled in the art that the present invention may easily be applied to any of the topologies of FIGS. 6a–6d or to any other polyphase topology not shown (for example, a four-wire uniground topology), as well as to the conventional, four-wire grounded wye distribution system topology. In addition, the inventive technique may be applied to simple, single-phase distribution systems, while still retaining the benefits of reduced MF, elimination of stray voltages and ease of high-z fault detection.

Since other modifications and changes varied to fit particular operating requirements and environments will be apparent to those skilled in the art, the invention is not considered limited to the example chosen for purposes of disclosure, and covers all changes and modifications which do not constitute departure from the true spirit and scope of this invention.

Having thus described the invention, what is desired to be protected by Letters Patent is presented in the subsequent appended claims.

What is claimed is:

1. A utility-class power distribution system for distributing electrical power from a power source to a distribution transformer utilizing a five-wire system wherein separate neutral and ground conductors are functionally independent of each other, comprising:

a) a hot electrical conductor disposed between and connected to said power source and said distribution transformer;

b) a neutral conductor disposed between and connected to said power source and said distribution transformer;

c) a ground conductor disposed between and connected to said power source and said distribution transformer, said ground conductor being connected to said power source, the earth and said distribution transformer; and d) a direct connection between said neutral conductor and said ground conductor, said connection being the only direct connection between said neutral conductor and said ground conductor, whereby essentially all neutral current between said power source and said distribution transformer flows in said neutral conductor, and essentially no current flows in said ground conductor, except under a fault condition between said hot conductor and the earth.

2. The utility-class power distribution system for distributing electrical power in accordance with claim 1, wherein said one point at which said neutral conductor and said ground conductor are connected via a direct connection is proximate said power source.

3. The utility-class power distribution system for distributing electrical power in accordance with claim 1, wherein said power source comprises at least one secondary winding of a transformer.

4. The system for distributing electrical power in accordance with claim 1, wherein said power source comprises an electrical generator.

5. The system for distributing electrical power in accordance with claim 1, wherein said power source comprises at least one distributed generation source.

6. The utility-class power distribution system for distributing electrical power in accordance with claim 1, the system further comprising:

e) detection means connected to said ground conductor for detecting current flow in said ground conductor and for generating an output signal that is representative thereof.

7. The utility-class power distribution system for distributing electrical power in accordance with claim 6, the system further comprising:

f) means connected to said detection means for clearing a fault in response to said output signal.

8. A method of distributing polyphase electrical power from a power source to a distribution transformer in a utility-class power distribution system, comprising the steps of:

a) providing a plurality of hot electrical conductors disposed between said power source and said distribution transformer;

b) providing a neutral conductor disposed between said power source and said distribution transformer;

c) providing a ground conductor disposed between said power source and said distribution transformer;

d) connecting said power source to said distribution transformer via said plurality of hot conductors and said neutral conductor; and e) connecting said ground conductor to said power source, to the earth, and, via a direct connection, to said neutral conductor at only one point.

9. The method of distributing polyphase electrical power from a power source to a distribution transformer in a utility-class power distribution system in accordance with claim 8, wherein said one point at which said neutral conductor and said ground conductor are connected via a direct connection is proximate said power source.

10. The method of distributing polyphase electrical power from a power source to a distribution transformer in a utility-class power distribution system in accordance with claim 8, wherein said polyphase electrical power is three-phase electrical power.

11. The method of distributing polyphase electrical power in a utility-class power distribution system in accordance with claim 8, the steps further comprising:

f) monitoring current in said ground conductor; and g) providing an output signal that is representative of said monitored current.

12. The method of distributing polyphase electrical power in a utility-class power distribution system in accordance with claim 11, the steps further comprising:

h) actuating an alarm in response to said output signal when said output signal exceeds a predetermined value.

13. The method of distributing polyphase electrical power in a utility-class power distribution system in accordance with claim 11, the steps further comprising:

h) clearing a fault in response to said output signal when said output signal exceeds a predetermined value.

14. A method of converting a conventional, utility-class power distribution system to a system with independent neutral and ground conductors, comprising the steps of:

a) connecting a respective ground conductor from a power source to each distribution transformer of a plurality of distribution transformers in said conventional, utility-class power distribution system;

b) connecting a respective neutral conductor from a power source to each distribution transformer in said conventional, utility-class power distribution system when said neutral conductor is not already present;

c) removing all connections between all neutral conductors of said conventional, utility-class power distribution system and the earth; and d) reconnecting said respective neutral conductors and said respective ground conductors of said conventional, utility-class power distribution system wherein each of the respective neutral conductors and each of the respective ground conductors are connected at only one point, whereby essentially all neutral current between said power source and each of said distribution transformers flows in each of said respective neutral conductors, and essentially no current flows in said respective ground conductors, except under a fault condition between a hot conductor and the earth.

15. The method of converting a conventional, utility-class power distribution system in accordance with claim 14, further comprising the step of:

e) reconfiguring said power source to a wye configuration.

16. The method of converting a conventional, utility-class power distribution system in accordance with claim 14, further comprising the step of:

e) reconfiguring a neutral current-sensing means to sense current in said respective ground conductors.

17. The method of converting a conventional, utility-class power distribution system in accordance with claim 14, wherein said only one point at which said respective neutral conductor is connected to ground is proximate said power source.

* * * * *